US009616908B2

(12) United States Patent
Brown (10) Patent No.: US 9,616,908 B2
(45) Date of Patent: Apr. 11, 2017

(54) MOBILE CART CONVERTIBLE AMONG A PLURALITY OF OPERATIONAL MODES

(71) Applicant: Ryon Brown, Leander, TX (US)

(72) Inventor: Ryon Brown, Leander, TX (US)

( * ) Notice: Subject to any disclaimer, the term of this patent is extended or adjusted under 35 U.S.C. 154(b) by 0 days.

(21) Appl. No.: 14/758,213

(22) PCT Filed: Dec. 27, 2013

(86) PCT No.: PCT/US2013/078132
§ 371 (c)(1),
(2) Date: Jun. 26, 2015

(87) PCT Pub. No.: WO2014/106130
PCT Pub. Date: Jul. 3, 2014

(65) Prior Publication Data
US 2015/0353111 A1    Dec. 10, 2015

Related U.S. Application Data

(60) Provisional application No. 61/746,814, filed on Dec. 28, 2012, provisional application No. 61/828,581, filed on May 29, 2013, provisional application No. 61/880,040, filed on Sep. 19, 2013.

(51) Int. Cl.
*B62B 1/04* (2006.01)
*B62B 1/10* (2006.01)
*B62B 1/12* (2006.01)
*B62B 1/20* (2006.01)
(Continued)

(52) U.S. Cl.
CPC .............. *B62B 1/208* (2013.01); *B62B 1/042* (2013.01); *B62B 1/12* (2013.01); *B62B 1/20* (2013.01); *E04H 15/06* (2013.01); *B62B 5/067* (2013.01); *B62B 2202/42* (2013.01);
(Continued)

(58) Field of Classification Search
CPC .... B62B 1/12; B62B 1/20; B62B 1/04; B62B 1/10; B62B 1/125; B62B 2203/04; B62B 2203/10; B62B 2206/04; B62B 5/0089
See application file for complete search history.

(56) References Cited

U.S. PATENT DOCUMENTS

4,460,188 A * 7/1984 Maloof ..................... B62B 1/20
280/30
6,302,414 B1 * 10/2001 Berthiaume ............ B62B 1/002
280/47.18
(Continued)

*Primary Examiner* — Bryan Evans
(74) *Attorney, Agent, or Firm* — Loza & Loza, LLP; Tyler J. Barrett (57) ABSTRACT

Mobile carts are adapted to facilitate both storage and mobility. In at least one example, a mobile cart may include a frame with a first longitudinal end and an opposing second longitudinal end. A swing-arm assembly may be coupled to the frame to pivot between a storage mode and a cart mode, where a handle is positioned adjacent the first longitudinal end of the frame and a pair of wheels are positioned beyond the second longitudinal end of the frame when the swing-arm assembly is positioned in the storage mode, and where the handle is positioned beyond the second longitudinal end of the frame and the wheels are positioned adjacent a bed portion of the frame when the swing-arm assembly is positioned in the cart mode. Other aspects, embodiments, and features are also included.

12 Claims, 11 Drawing Sheets

(51) Int. Cl.
*E04H 15/06* (2006.01)
*B62B 5/06* (2006.01)
(52) U.S. Cl.
CPC ..... *B62B 2205/12* (2013.01); *B62B 2206/006* (2013.01); *B62B 2301/10* (2013.01); *Y10T 29/49623* (2015.01)

(56) References Cited

U.S. PATENT DOCUMENTS

| | | | | |
|---|---|---|---|---|
| 6,328,319 | B1* | 12/2001 | Stahler, Sr. | B62B 1/002 280/47.18 |
| 2008/0236972 | A1* | 10/2008 | Lee | A45C 5/146 190/18 A |
| 2012/0302130 | A1* | 11/2012 | Robins | A63H 17/262 446/464 |

\* cited by examiner

MOBILE CART CONVERTIBLE AMONG A PLURALITY OF OPERATIONAL MODES

CROSS-REFERENCE TO RELATED APPLICATIONS

This application is the U.S. national stage of International Patent Application No. PCT/US13/78132, filed on Dec. 27, 2013 and entitled A MOBILE CART CONVERTIBLE AMONG A PLURALITY OF OPERATIONAL MODES, which claims the benefit of priority under 35 U.S.C. §119 to Provisional Application No. 61/746,814 entitled "Shelving Unit for the Storage of Food Goods, Non-Food Materials and/or Supplies for Emergencies (e.g. 72-Hour Kits) That Converts into a Handcart Via Two Pivoting Swing Arms for Rapid Mobility in the Event of an Emergency Evacuation" filed Dec. 28, 2012, which is hereby expressly incorporated by reference herein. The present application for Patent also claims priority to Provisional Application No. 61/828,581 entitled "Shelving Unit for the Storage of Food Goods, Non-Food Materials and/or Supplies for Emergencies (e.g. 72-Hour Kits) That Converts into a Handcart Via Two Pivoting Swing Arms for Rapid Mobility in the Event of an Emergency Evacuation" filed May 29, 2013, which is hereby expressly incorporated by reference herein. The present application for Patent further claims priority to Provisional Application No. 61/880,040 entitled "A Handcart with a Pivoting Swing Arm for Facilitating Storage and Lifting Assistance" filed Sep. 19, 2013, which is hereby expressly incorporated by reference herein.

TECHNICAL FIELD

The technology discussed below relates generally to mobile carts, and more specifically to methods and devices for facilitating storage and mobility in mobile carts.

BACKGROUND

Mobile carts, such as handcarts, of various types have been in use for a very long time all over the world. Traditional mobile carts are typically designed for one function and typically do not assist in lifting heavy object. Additionally, traditional mobile carts take up a relatively large amount of space in a person's house or garage when stored in their intended position (prone). For example, wheels and handles of traditional mobile carts may present problems with most cart designs. If the wheel and axle is fixed in its location on a standard handcart, the cart cannot be set on its end without the wheels protruding out and obstructing the space immediately around the device, potentially causing a dangerous trip hazard in one's house or garage. On the other hand, if the wheel and axle is fixed and positioned deeper within the body (as opposed to the bottom edge of the body), the ground clearance of the handcart is then severely reduced.

The handle of a traditional handcart also presents a serious problem for long term storage in areas where people might be living, working, or walking. Traditional handles protrude out at shin-level are also dangerous trip hazards.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure include mobile carts that are capable of use in a storage mode, a loading mode, and a cart mode. In one or more examples, a mobile cart may include a frame with a first longitudinal end and an opposing second longitudinal end. A swing-arm assembly may be coupled to the frame between the first and second longitudinal ends to pivot between a storage mode and a cart mode. The swing-arm assembly can include swing arms, a respective wheel rotatably coupled to a first longitudinal end of each swing arm, and a handle coupled to a second longitudinal end of the swing arms, opposite from the wheels. When the swing-arm assembly is positioned in the storage mode, the handle is positioned adjacent the first longitudinal end of the frame to enable the frame to rest on the first longitudinal end and the wheels are positioned beyond the second longitudinal end of the frame. When the swing-arm assembly is positioned in the cart mode, the handle is positioned beyond the second longitudinal end of the frame and the wheels are positioned adjacent a bed portion of the frame.

In one or more further examples, a mobile cart may include a frame with a first longitudinal end and an opposing second longitudinal end. A plurality of sliding bracket mounts may be pivotably coupled to the frame. Further, a swing-arm assembly may be coupled to the sliding bracket mounts to pivot in relation to the frame between a storage mode and a cart mode. The swing-arm assembly may include respective swing arms slidably coupled to each sliding bracket mount to facilitate longitudinal displacement of each swing arm in the respective sliding bracket mount. The swing-arm assembly may also include a respective wheel rotatably coupled to a first longitudinal end of each swing arm, and a handle coupled to a second longitudinal end of the swing arms, opposite from the wheels.

One or more additional examples and implementations of the present disclosure include methods of making mobile carts that are capable of use in a storage mode, a loading mode, and a cart mode. According to at least one example, such methods may include forming a frame with a first longitudinal end and an opposing second longitudinal end. A swing-arm assembly may also be formed to include two swing arms, a wheel coupled to a first longitudinal end of each swing arm, and a handle coupled to a second longitudinal end of the swing arms, opposite from the wheels. The swing-arm assembly may be coupled to the frame to pivot between a storage mode and a cart mode, where the handle is positioned adjacent the first longitudinal end of the frame and the wheels are positioned beyond the second longitudinal end of the frame when the swing-arm assembly is positioned in the storage mode, and the handle is positioned beyond the second longitudinal end of the frame and the wheels are positioned adjacent a bed portion of the frame when the swing-arm assembly is positioned in the cart mode.

Other aspects, features, and embodiments associated with the present disclosure will become apparent to those of ordinary skill in the art upon reviewing the following description in conjunction with the accompanying figures.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details.

The illustrations presented herein are, in some instances, not actual views of any particular mobile cart or mobile cart components, but are merely idealized representations, which are employed to describe various features associated with one or more embodiments of the present disclosure. Additionally, elements common between figures may retain the same numerical designation.

Figure 1:
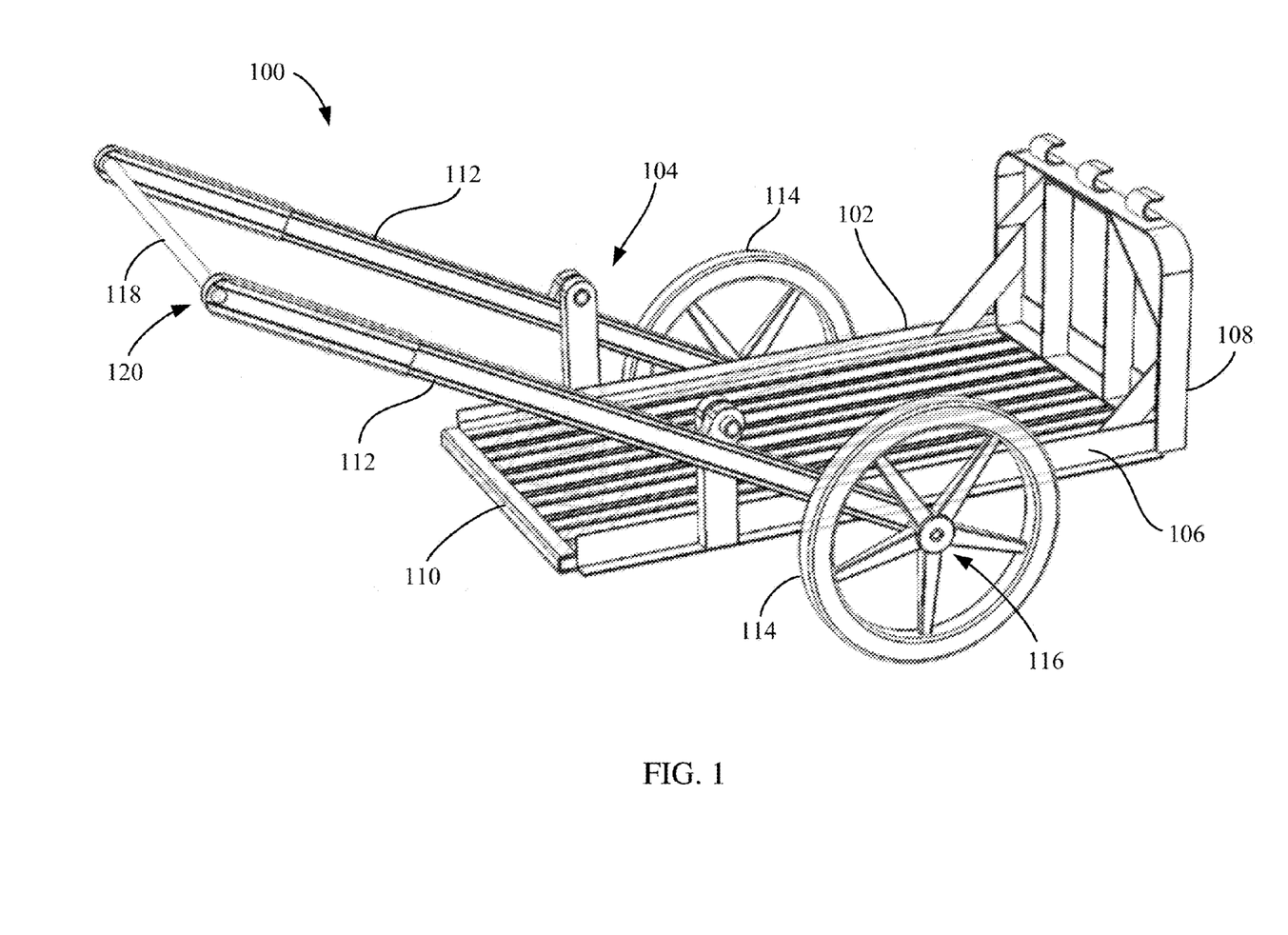
FIG. 1 is an isometric view of a mobile cart in a cart mode is shown according to at least one example of the present disclosure.

Various embodiments of the present disclosure include mobile carts adapted to facilitate both mobility and storage. Referring to FIG. 1, an isometric view of a mobile cart 100 in a cart mode is shown according to at least one example of the present disclosure. In general, the mobile cart 100 includes a frame 102 coupled with a swing-arm assembly 104. The frame 102 generally includes a bed portion 106 with a first longitudinal end 108 and a second longitudinal end 110.

The swing-arm assembly 104 generally includes two parallel swing arms 112 that are pivotably coupled to the frame 102. Two wheels 114 are rotatably coupled to a first longitudinal end 116 of the swing arms 112, and a handle 118 is coupled to a second longitudinal end 120 of the swing arms 112.

Figure 2:
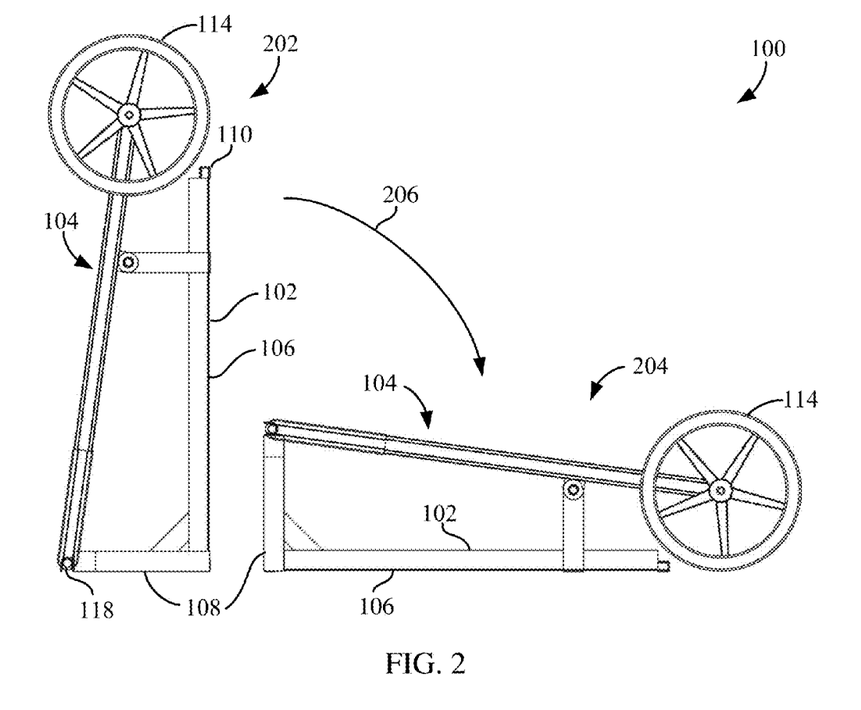
FIG. 2 is a side view of the mobile cart of FIG. 1 in a storage mode and in a loading mode.

The mobile cart 100 is adapted to convert from the cart mode shown in FIG. 1 to a storage mode, as depicted in FIG. 2. At the left side of FIG. 2, the mobile cart 100 is shown in a storage mode 202. As shown, the handle 118 is positioned adjacent the first longitudinal end 108 of the frame 102 when the swing-arm assembly 104 is positioned in the storage mode 202. In some examples, the handle 118 may be retained by a hook or other retention means. With the handle 118 located adjacent the first longitudinal end 108 of the frame 102, the mobile cart 100 can be positioned upright on the first longitudinal end 108 of the frame 102. As shown, the handle 118 is out of the way so as to not interfere with the ability of the mobile cart 100 to rest on the first longitudinal end 108 of the frame 102 and to be out of the way of passersby to enable the mobile cart 100 to be stored in a relatively limited space. In some examples, the handle 118 can be adapted to telescope along the longitudinal length of the swing arms 112. In such examples, a locking mechanism similar to that described below with reference to FIG. 8 may be employed to lock the handle 118 into one or more positions.

As also shown in FIG. 2, the wheels 114 are positioned beyond the second longitudinal end 110 of the frame 102 when the swing-arm assembly 104 is positioned in the storage mode 202. That is, at least an axle (see axle 508 in FIG. 5) extending between the centers of the two wheels 114 can be positioned beyond the second longitudinal end 110 of the frame 102. With the wheels 114 positioned beyond the second longitudinal end 110, the bed portion 106 of the frame 102 can be positioned against a surface, such as a wall, without the wheels 114 interfering with surface when in the storage mode 202. Additionally, the mobile cart 100 can be placed with the bed portion 106 flat on the ground, as shown at the right side of FIG. 2, in what may be referred to herein as a loading mode 204. That is, the mobile cart 100 can be repositioned in the direction of arrow 206 until the bed portion 106 is flat on the ground. In some instances, the wheel axle (axle 508 in FIG. 5) referred to above can be used as another handle to lower the second longitudinal end 110 of the frame 102 toward the ground from the storage mode 202 to the loading mode 204.

Figure 3:
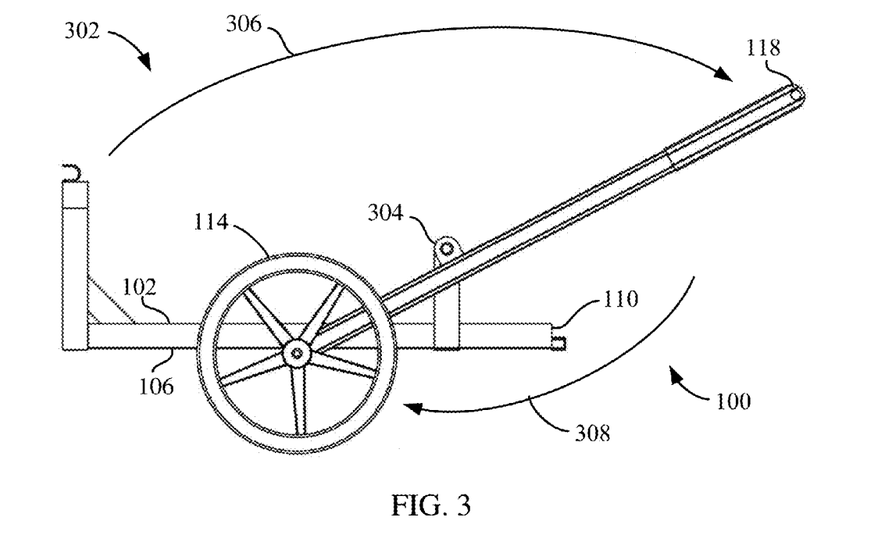
FIG. 3 is a side view of the mobile cart of FIG. 1 in a cart mode.

Referring to FIG. 3, a side view is shown of the mobile cart 100 in a cart mode 302. The mobile cart 100 can be converted into the cart mode 302 directly from either the storage mode 202 or the loading mode 204 in FIG. 2. In general, the swing-arm assembly 104 can be pivoted about a pivot 304. For instance, the handle 118 can be pivoted in the direction of arrow 306 to a position beyond the second longitudinal end 110 of the frame 102. When the handle 118 pivots as shown, the wheels 114 also pivot in the direction of the arrow 308 until the wheels 114 are positioned adjacent the bed portion 106 of the frame 102. That is, the wheels 114 pivot until they are adjacent a bottom surface of the bed portion 106, as shown in FIG. 3. With the swing-arm assembly 104 positioned in cart mode 302 can enable a person to pull or push at the handle 118 to move the mobile cart 100 as desired.

Figure 4:
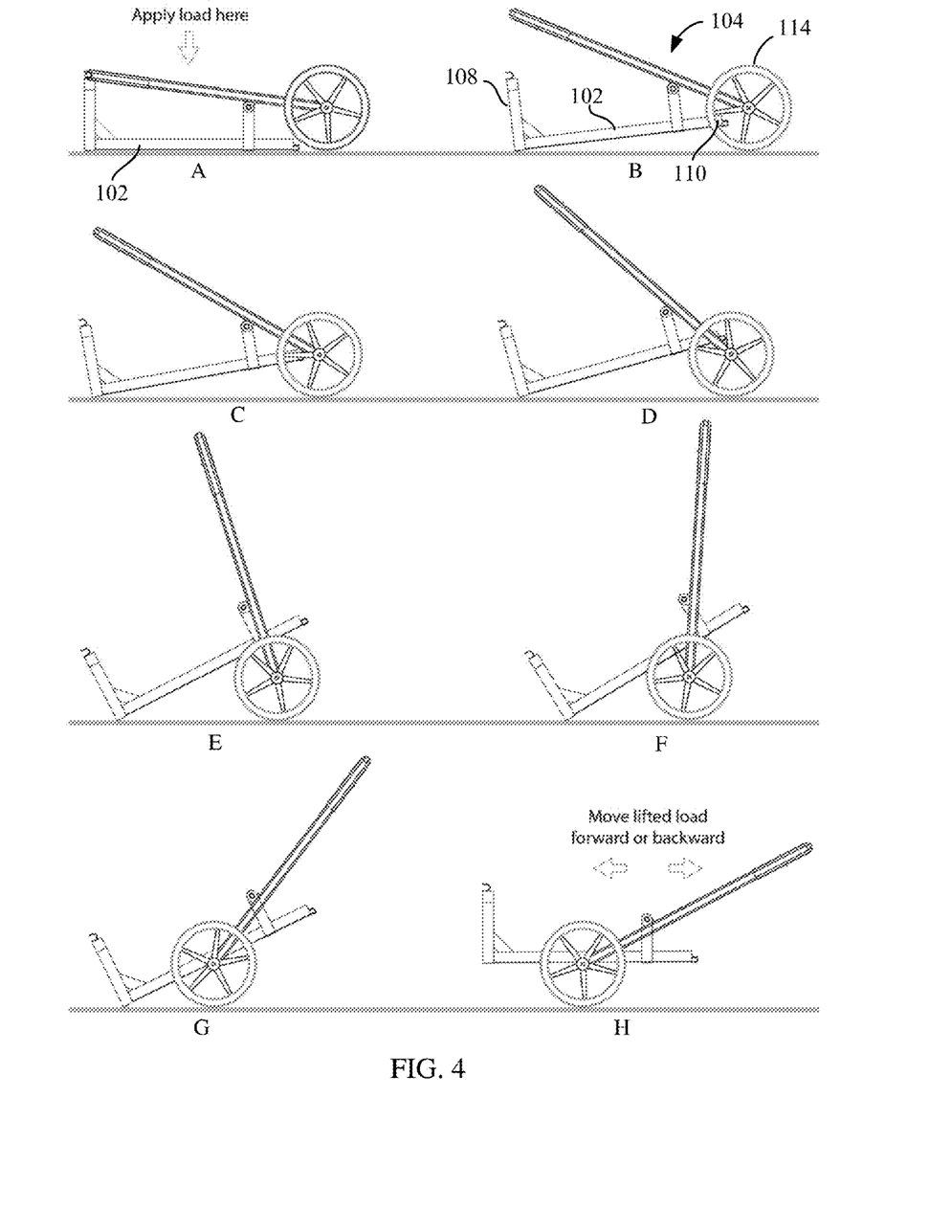
FIG. 4 is a side view of the mobile cart of FIG. 1 illustrating various stages of the swing-arm assembly when converting from the loading mode to the cart mode, and also illustrates the lift assistance mechanism provided by the swing-arm assembly.

The swing-arm assembly 104 of the mobile cart 100 of the present disclosure is configured to facilitate a lift assistance mechanism when the mobile cart 100 is converted from the loading mode 204 to the cart mode 306. FIG. 4 shows various stages of the swing-arm assembly 104 when converting from the loading mode to the cart mode, and illustrates the lift assistance mechanism provided by the swing-arm assembly. In FIG. 4, each illustrated stage is identified by a consecutive letter for reference purposes. At stage 'A', the mobile cart 100 is in the loading mode. At this stage, one or more items may be placed on the frame 102 if not already placed thereon. At stage 'B', the swing-arm assembly 104 is pivoted, and the handle 114 begins moving from the first longitudinal end 108 of the frame 102 toward the second longitudinal end 110. Additionally, the wheels 114 begin to rotate under the frame 102, causing the second longitudinal end 110 of the frame 102 to lift upward as the wheels 114 move against the ground. As seen from stages 'C' through 'G', the wheels 114 rotate and lift the frame 102 until the wheels are positioned against the bottom of the frame 102.

Figure 5:
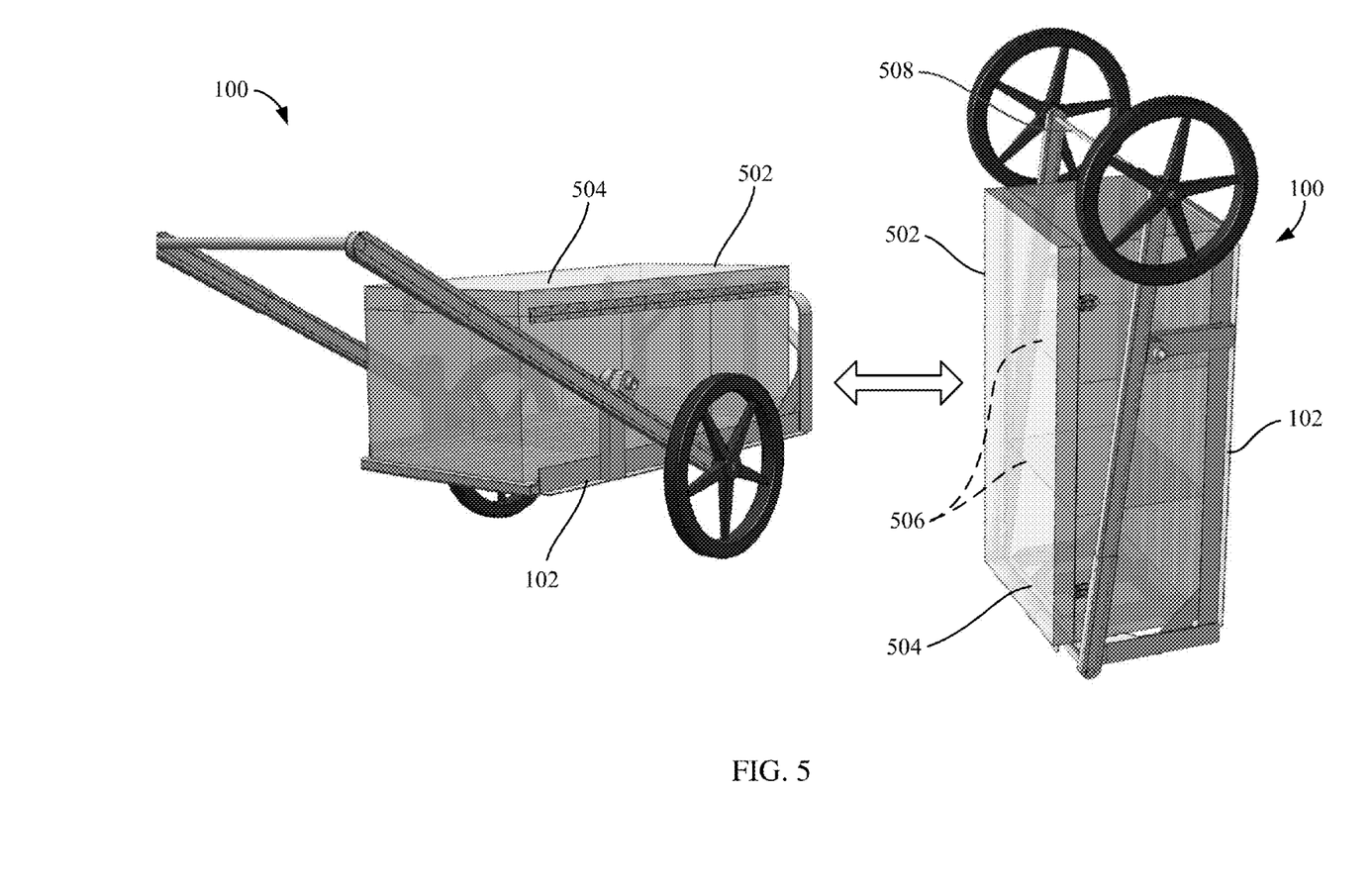
FIG. 5 are perspective views of the mobile cart of FIG. 1 in cart mode and storage mode with an attachable/detachable component configured as a storage box positioned on the frame.

At stage 'H', the frame can be rotated so the bed portion 106 is at least substantially parallel with the ground and the weight of the load on the frame 102 is supported by the wheels 114. That is, the frame 102, and any load placed thereon, can be supported by the axle 508 in FIG. 5 coupled to the wheels 114. In some examples, a free-moving sleeve may be positioned around the axle 508 so weight from the frame 102 and/or load can be supported by the axle 508 without significantly creating friction on the wheel bearings According to various embodiments, the frame 102 may be formed with any of a number of different configurations. In the example in FIG. 1 through FIG. 4, the frame 102 includes a relatively flat bed portion 106 forming a bed, and a foot at the first longitudinal end 108, which foot may be removable in some embodiments. This configuration of the frame 102 in this example can enable the mobile cart 100 to receive any of a number of objects of various shapes and sizes for transport by the mobile cart 100. In addition, this configuration of the frame 102 can facilitate attachment of a number of attachable and detachable components, which attachable and detachable components can further expand the versatility of the mobile cart 100. By way of example and not limitation, FIG. 5 illustrates an example of a mobile cart 100 with an attachable/detachable component configured as a storage box 502 positioned on the frame 102 in both the cart mode and the storage mode. The storage box 502 can include a lid/door 504 and/or a plurality of shelves 406. When the swing-arm assembly 104 of the mobile cart 100 is positioned in the storage mode, the storage box 502 can be used to store items on the plurality of shelves 506. The mobile cart 100 can then be converted from the storage mode to the cart mode while all items stored on the shelves remain within the storage box 502. The items within the storage box 502 can then be easily transported by the mobile cart 100 as desired.

Figure 15:
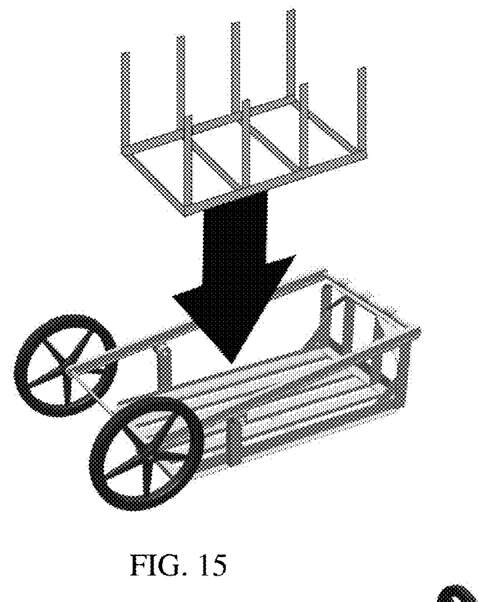
FIG. 15 is an isometric view of a frame with load-securing brackets that may be attachable or integral with the frame.
Figure 16:
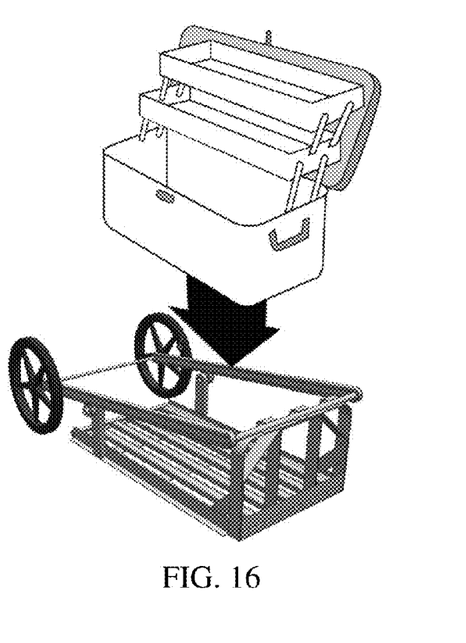
FIG. 16 is an isometric view of a frame with a multi-purpose utility box with hinging shelves and a lid that may be attachable or integral with the frame.
Figure 17:
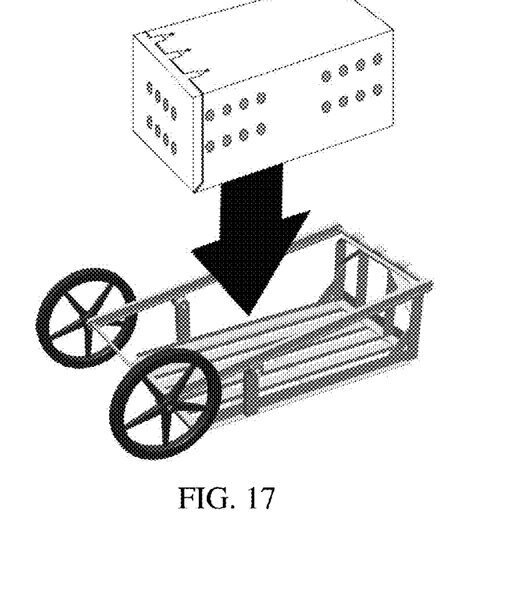
FIG. 17 is an isometric view of a frame with a pet carrier that may be attachable or integral with the frame.

The storage box 502 is just one example of an attachable/detachable component. A plurality of other configurations are also possible such as, by way of example and not limitation, a plurality of smaller storage boxes, a barrel, load-securing brackets 1502 (see, e.g., FIG. 15) extending transverse from the bed portion 106 for supporting items from falling off a side of the bed portion 106, a multi-purpose utility box with hinging shelves and a lid (see, e.g., FIG. 16), a water or fuel container(s), a pet carrier (see, e.g., FIG. 17), mobile communications equipment such as a ham radio, netting for holding down odd-shaped loads, etc. The various attachable/detachable components may be attached to the frame 102 by coupling the component to clips, ties, hook and loop (e.g., VELCRO), and/or other coupling means which are anchored to the frame 102.

Figure 6:
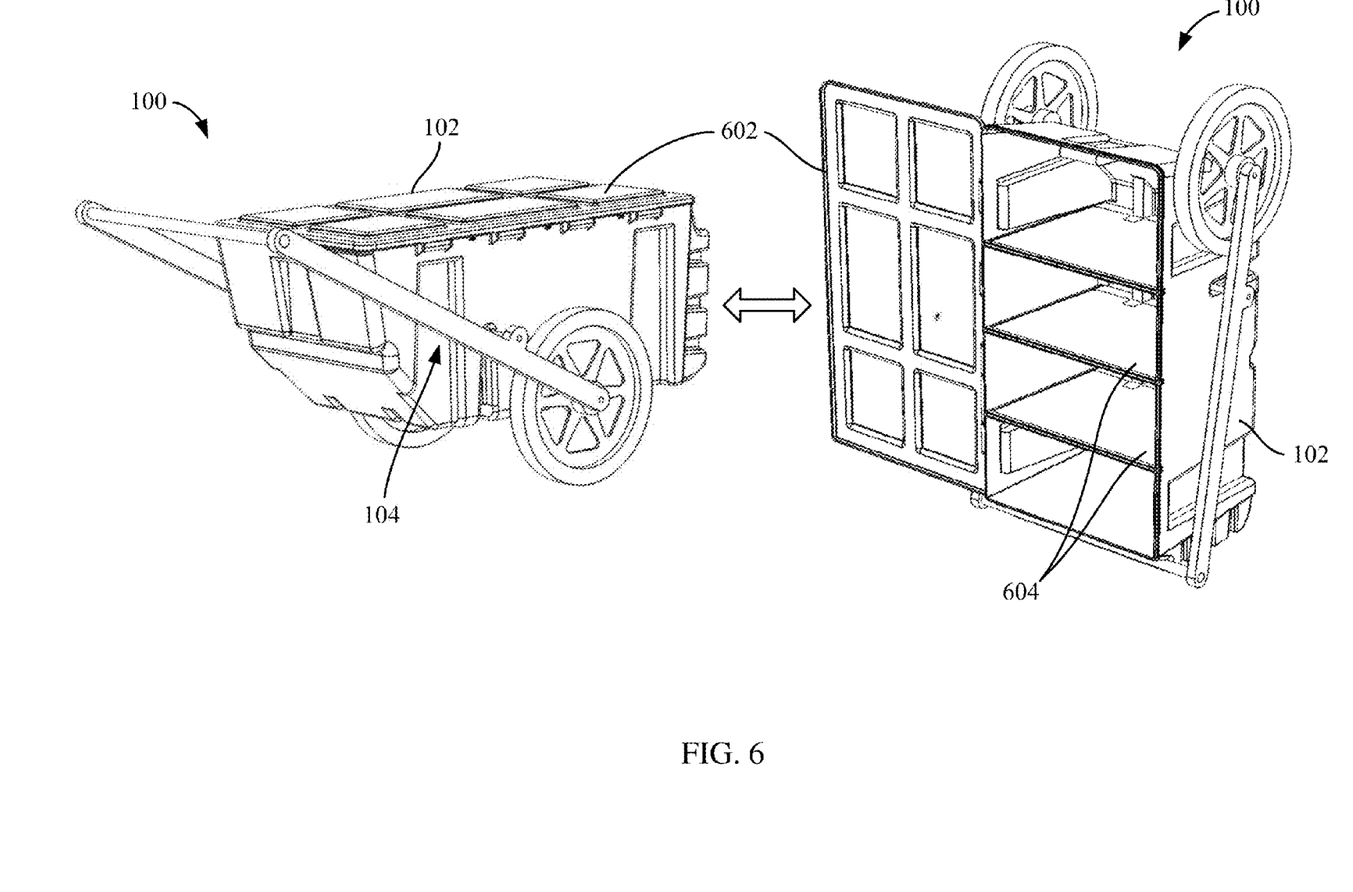
FIG. 6 illustrates perspective views of an embodiment of a mobile cart in both the cart mode and the storage mode, where the mobile cart includes a frame configured as a storage box.

In another example of a mobile cart, the frame 102 itself can be configured as a storage box. For instance, FIG. 6 illustrates an embodiment of a mobile cart 100 in both the cart mode and the storage mode, where the mobile cart 100 includes a frame 102 configured as a storage box. As shown, the swing-arm assembly 104 pivotably coupled to the frame 102. In this example, the frame 102 includes a lid/door 602 and/or a plurality of shelves 604. When the swing-arm assembly 104 of the mobile cart 100 is positioned in the storage mode, the frame 102 can be used to store items on the plurality of shelves 604. The mobile cart 100 can then be converted from the storage mode to the cart mode while all items stored on the shelves remain within the frame 102. The items within the frame 102 can then be easily transported by the mobile cart 100 as desired.

The foregoing are just some examples of different configurations of the frame 102. As noted previously, the frame 102 can be formed into any of a plurality of different configurations. In some embodiments, the frame 102 may be formed to have a configuration similar to at least some of the examples of attachable/detachable component configurations described above. For example, the frame 102 may be configured as, or to include, a barrel, load-securing brackets 1502 (see, e.g., FIG. 15) extending transverse from the bed portion 106 for supporting items from falling off a side of the bed portion 106, a multi-purpose utility box with hinging shelves and a lid (see, e.g., FIG. 16), water or fuel containers, a pet carrier (see, e.g., FIG. 17), mobile communications equipment such as a ham radio, netting for holding down odd-shaped loads, etc.

One example of a scenario in which the mobile cart 100 with a storage box 502 or with a frame 102 configured as a storage box may find utility is in emergency preparedness and evacuation situations. For example, a user may store a plurality of emergency preparedness items on the shelves of the storage box with the mobile cart 100 positioned in the storage mode. These items may be easily accessed and used as needed. In the event of an emergency, the user can simply convert the mobile cart 100 into the cart mode by pivoting the swing-arm assembly 104 as described above with reference to FIG. 3. With the mobile cart 100 in cart mode, the emergency items can be easily moved and taken to a new location as needed.

Figure 7:
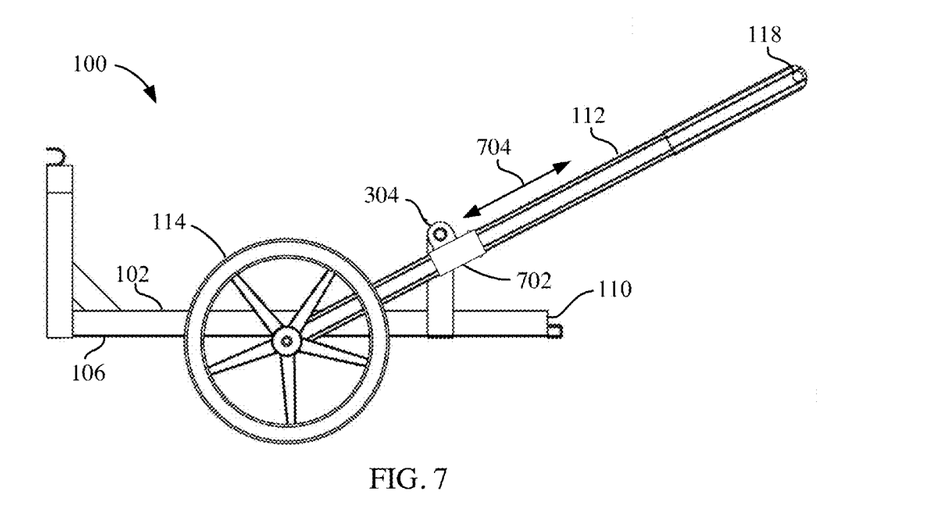
FIG. 7 is a side view of the mobile cart of FIG. 1 in a cart mode where the swing-arm assembly is coupled to the frame with sliding bracket mounts.

Referring now to FIG. 7, in some embodiments, the swing-arm assembly 104 can be coupled to the frame 102 in a manner that enables the swing arms 112 to displace longitudinally in relation to the pivot 304. For example, the swing arms 112 can be disposed within a sliding bracket mount 702. That is, a sliding bracket mount 702 may be slidably coupled to each respective swing arm 112. The sliding bracket mount 702 is configured to at least substantially encircle a portion of the swing arm 112, and to be pivotably coupled to the frame 102 at the pivot 304. The sliding bracket mount 702 enables the swing arms 112 to displace longitudinally in the direction of arrow 704.

Figure 8:
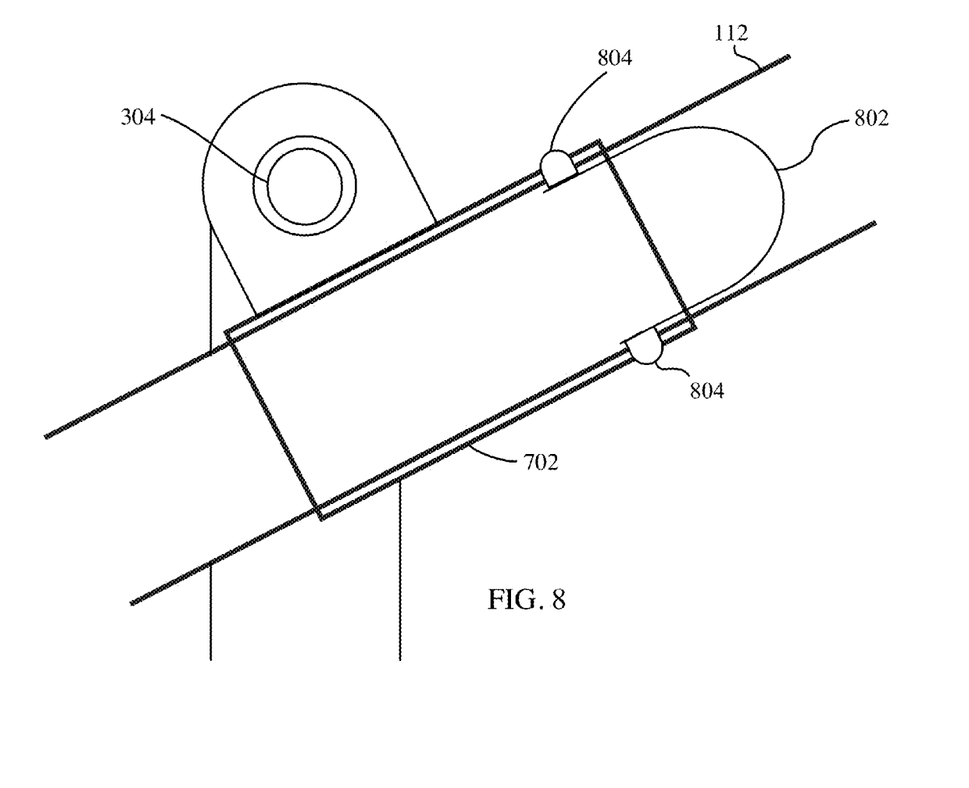
FIG. 8 is a schematic diagram of the sliding bracket mount with a locking mechanism positioned inside the swing arm according to at least one example.

In some examples, the sliding bracket mount 702 may be configured to lock into one or more positions along the swing arm 112. For example, FIG. 8 is a schematic diagram of the sliding bracket mount 702 with a locking mechanism positioned inside the swing arm 112 according to at least one example. As shown, the locking mechanism can include a spring 802 coupled with one or more pins 804. The pins 804 project through an aperture within the swing arm 112. The sliding bracket mount 702 can also include apertures configured to receive the pins 804 therethrough. When the sliding bracket mount 702 is in a preferred position, such as a preferred cart mode position, the spring 802 can cause the pins 804 to enter into the apertures in the sliding bracket mount 702 to lock the sliding bracket mount 702 into place. When desired, a user can depress the pins 804 inward to release the sliding bracket mount 702.

Figure 9:
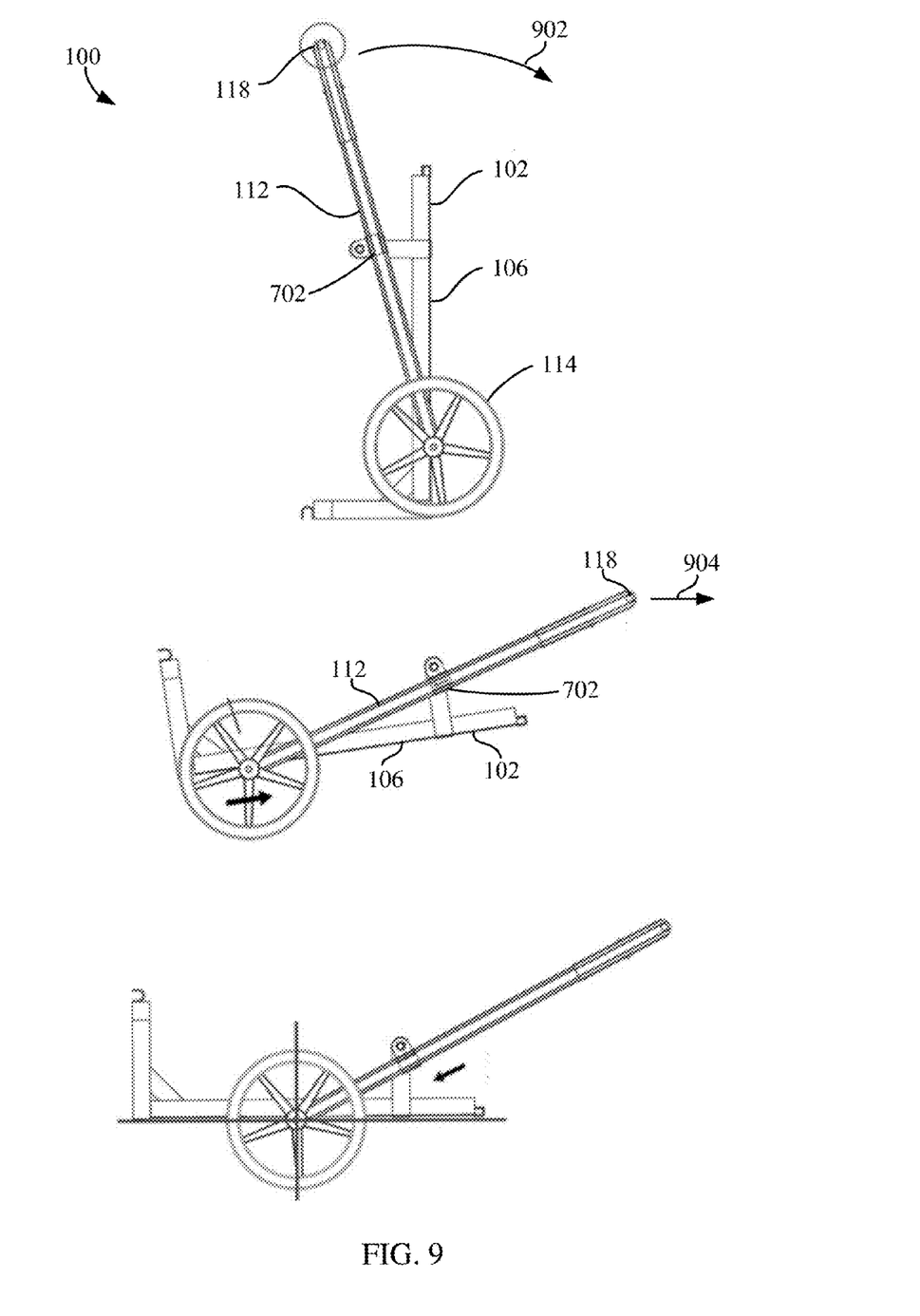
FIG. 9 is are schematic side views of the mobile cart illustrating various stages of a rapid deployment using sliding bracket mounts.

According to at least one feature, the sliding bracket mount 702 can facilitate a rapid deployment of the mobile cart 100 from a variation of a storage mode to a cart mode. As shown in FIG. 9, the mobile cart 100 can be stored in a rapid-deployment mode, which may be identified as a variation of the storage mode 202 described with reference to FIG. 2. In this example, the swing arms 112 are slid downward in the sliding bracket mount 702 so the wheels 114 are on the ground behind the bed portion 106 of the frame 102, as illustrated at the top of FIG. 9. When the mobile cart 100 is needed, a user can pull the handle 118 in the direction of the arrow 902, rotating the mobile cart 100 to a position similar to that shown in the middle diagram in FIG. 9. As the user continues to pull the handle 118 in the direction of arrow 904, the swing arms 112 can slide within the sliding bracket mount 702. The free-spinning sleeve over the wheel axle (axle 508 in FIG. 8) mentioned above can facilitate low-friction travel of the axle along the bed portion 106 of the frame 102. The swing arms 112 travel through the sliding bracket mount 702 until the pins 804 (see FIG. 8) in the swing arms 112 align with apertures in the sliding bracket mount 702. The spring 802 (see FIG. 8) pushes the pins 804 through the apertures in the sliding bracket mount 702 to lock the swing arms 113 into the cart mode position, as shown in the bottom illustration in FIG. 9.

Figure 10:
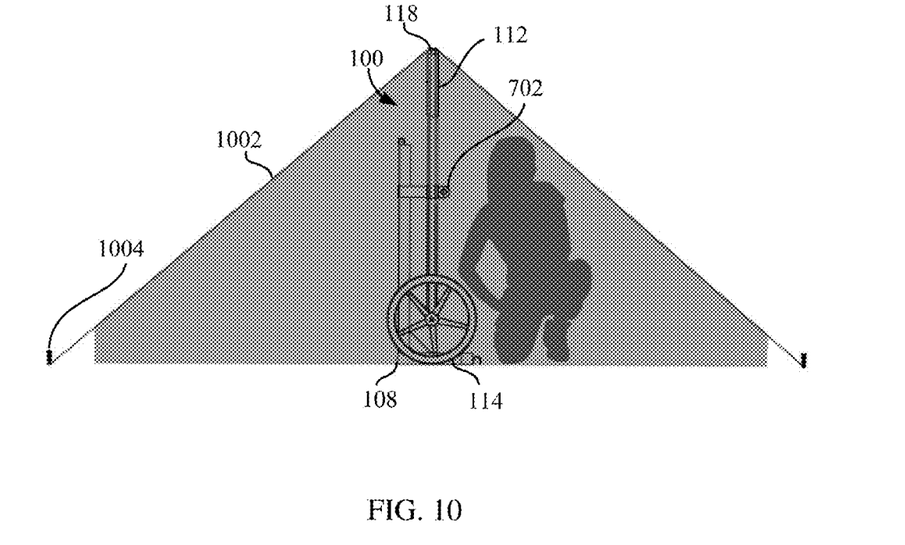
FIG. 10 shows an example of a mobile cart converted for operation as a support for a shelter.

According to additional features, the sliding bracket mount 702 can also enable the mobile cart 100 to be converted into a number of different configurations. For example, FIG. 10 shows an example of a mobile cart 100 converted for operation as a support for a shelter, which may be referred to herein as a shelter mode. As shown, the mobile cart 100 can be positioned with the swing arms 112 slid in the sliding bracket mount 702 so that both the first longitudinal end 108 and the wheels 114 on the ground. The handle 118 can be used to support a covering 1002, such as a tarp, sheet, blanket, etc., which covering 1002 can be anchored down by conventional stakes 1004 to form a tent-like shelter.

Figure 11:
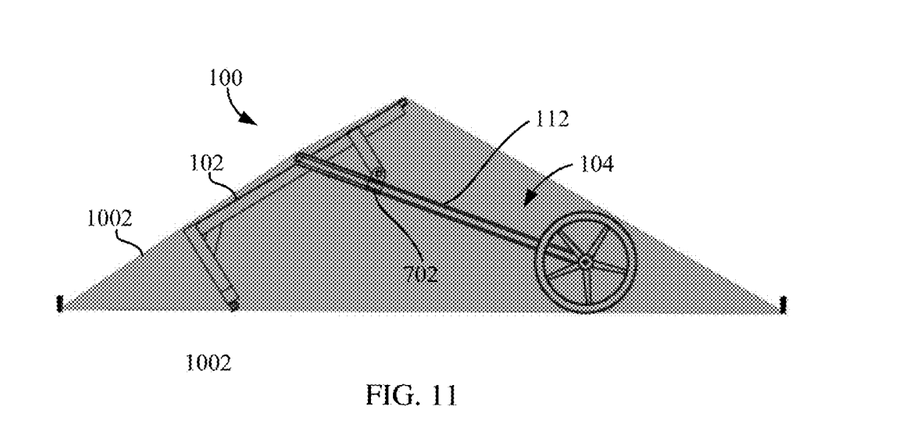
FIG. 11 shows another example of a mobile cart configuration that may be employed for a shelter.

FIG. 11 shows another example of a mobile cart 100 configuration that may be employed for a shelter (e.g., configured in a shelter mode). In this example, the sliding bracket mount 702 may be employed so the swing arms 112 can be repositioned as shown with the swing-arm assembly 104 extending away from the frame 102. In this example, the frame 102 provides the support for a covering 1002.

Figure 12:
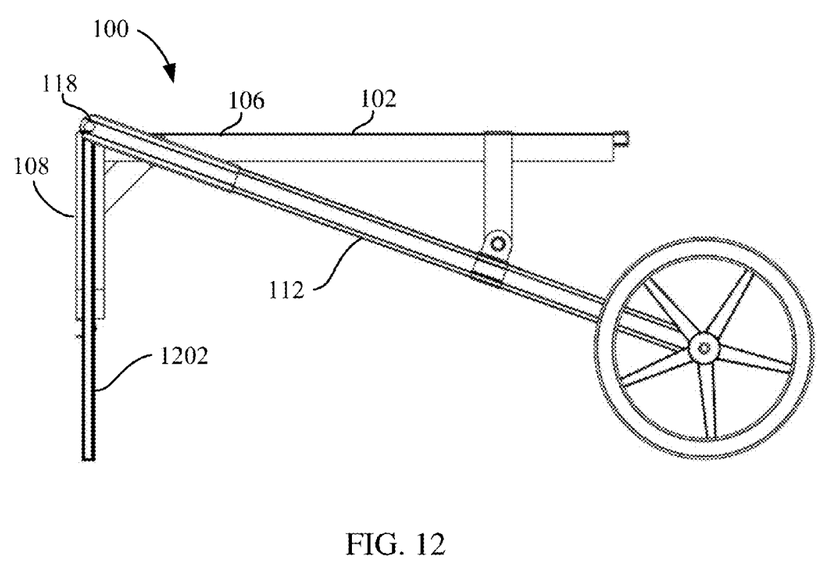
FIG. 12 is an example of a mobile cart deployed in a table mode according to at least one embodiment.

In some examples of a mobile cart 100, the mobile cart 100 can further be configured to be deployed as a table. In FIG. 12, an example of a mobile cart 100 depicted in FIGS. 1-3 is shown deployed in a table mode. In this example, the swing arms 112 can be pivoted so the handle 118 is located adjacent to the first longitudinal end 108 of the frame 102 and adjacent to the bed portion 106. As shown, a pair of support legs 1202 may be included to raise the first longitudinal end 108 of the frame 102 so that the bed portion 106 is at least substantially horizontal.

Figure 13:
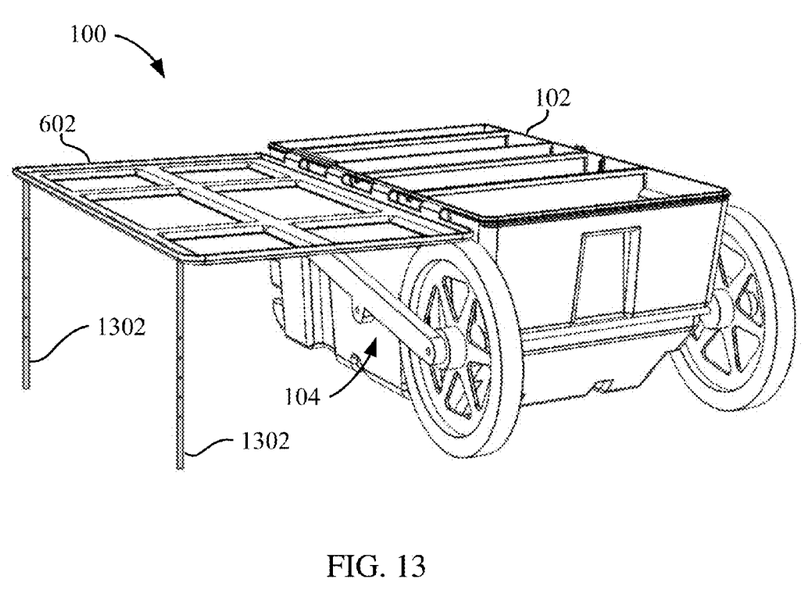
FIG. 13 is another example of a mobile cart deployed in a table mode according to at least one embodiment.

Referring now to FIG. 13, an example of the mobile cart 100 depicted in FIG. 6 is shown deployed in a table mode. In this example, the swing-arm assembly 104 is positioned in the storage mode, and the frame 102 is place down in the storage mode. The lid/door 602 is opened, and a pair of telescoping legs 1302 are positioned under a portion of the lid/door 602 to retain the lid/door 602 at least substantially horizontal. In this manner, the lid/door 602 operates as a table.

Figure 14:
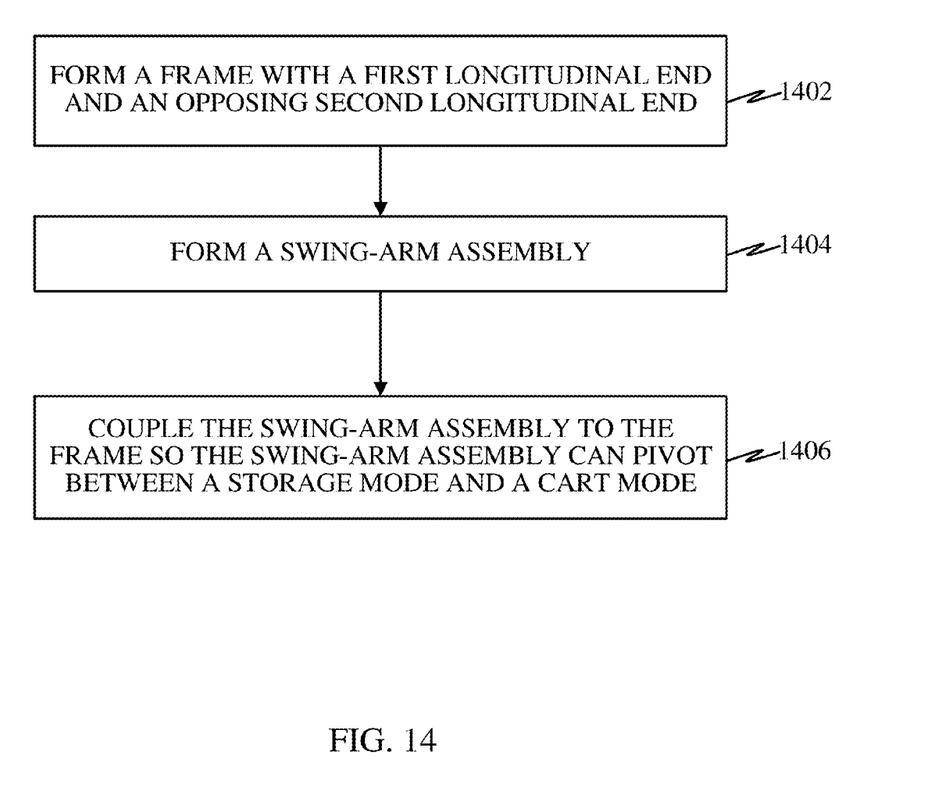
FIG. 14 is a flow diagram illustrating at least one example of a method of making a mobile cart.

Additional aspects of the present disclosure include methods of making a mobile cart, such as a mobile cart 100. FIG. 14 is a flow diagram illustrating at least one example of a method of making a mobile cart. Referring to FIGS. 1, 6, 8, and 14, a frame 102 may be formed with a first longitudinal end 108 and a second longitudinal end 110, at step 1402. As shown in FIG. 1, the frame 102 may be formed with a bed portion 106 and a foot at the first longitudinal end 108. In other examples, the frame 102 may be formed to include or as a storage container (e.g., see the frame 102 in FIG. 6), a barrel, load-securing brackets 1502 (see, e.g., FIG. 15) extending transverse from the bed portion 106 for supporting items from falling off a side of the bed portion 106, a multi-purpose utility box with hinging shelves and a lid (see, e.g., FIG. 16), water or fuel containers, a pet carrier (see, e.g., FIG. 17), mobile communications equipment such as a ham radio, netting for holding down odd-shaped loads, etc. The frame 102 may be formed of any of a plurality of suitable materials or combination of materials, such as metal, plastic, wood, composite, etc.

At step 1404, a swing-arm assembly 104 may be formed. The swing-arm assembly 104 can be formed to include two swing arms 112 extending longitudinally at least substantially in parallel with each other. A wheel 114 may be coupled to a first longitudinal end 116 of each swing arm 112. A wheel axle 508 (see FIG. 5) may be positioned between the two wheels 114 and, in at least some embodiments, a free-moving sleeve may be positioned around the wheel axle 508. The swing-arm assembly 104 may further be formed with a handle 118 coupled to a second longitudinal end 120 of the swing arms 112 and extending between both swing arms 112. In at least one example, the handle 118 may be coupled to the swing arms 112 in a manner to enable the handle to telescope away from and toward the swing arms 112. As noted above, the swing arms 112 may include a locking mechanism configured to lock the handle 118 into one or more positions.

At step 1406, the swing-arm assembly 104 may be coupled to the frame 102 so the swing-arm assembly 104 can pivot between a storage mode and a cart mode. For example, the swing arms 112 can be pivotably coupled to the frame 102 at a pivot 304. In some embodiments, the swing arms 112 may be coupled to respective sliding bracket mounts 702, which sliding bracket mounts 702 can be pivotably coupled to the frame 102. In such embodiments, an locking mechanism can be disposed within each of the swing arms 112 to enable the swing arms 112 to lock into one or more positioned in relation to the sliding bracket mounts 702.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A mobile cart, comprising:
   a frame including a first longitudinal end and an opposing second longitudinal end;
   a plurality of sliding bracket mounts pivotably coupled to the frame; and
   a swing-arm assembly coupled to the sliding bracket mounts to pivot in relation to the frame between a storage mode and a cart mode, the swing-arm assembly comprising:
      a respective swing arm slidably coupled to each sliding bracket mount to facilitate longitudinal displacement of each swing arm in the respective sliding bracket mount;
      a respective wheel rotatably coupled to a first longitudinal end of each swing arm;
      a handle coupled to a second longitudinal end of the swing arms, opposite from the wheels; and
      a locking mechanism disposed within each of the swing arms, each locking mechanism including a spring portion and one or more pins coupled with the spring portion.

2. The mobile cart of claim 1, wherein the handle is positioned adjacent the first longitudinal end of the frame and the wheels are positioned proximate the second longitudinal end of the frame when the swing-arm assembly is positioned in the storage mode.

3. The mobile cart of claim 1, wherein the handle is positioned beyond the second longitudinal end of the frame and the wheels are positioned adjacent a bed portion of the frame when the swing-arm assembly is positioned in the cart mode.

4. The mobile cart of claim 1, further comprising a storage container removably coupled to the frame.

5. The mobile cart of claim 1, wherein the frame is configured as a storage container.

6. The mobile cart of claim 1, wherein the swing-arm assembly is further configured to convert to at least one mode selected from the group of modes comprising a rapid-deployment mode, a shelter mode, and a table mode.

7. A method of making a mobile cart, comprising:
   forming a frame with a first longitudinal end and an opposing second longitudinal end;
   forming a swing-arm assembly including two swing arms, a wheel coupled to a first longitudinal end of each swing arm, and a handle coupled to a second longitudinal end of the swing arms, opposite from the wheels;
   disposing a locking mechanism within each of the swing arms, wherein the locking mechanism comprises a spring portion and one or more pins coupled with the spring portion, the one or more pins of each locking mechanism configured to fit into one or more apertures in a respective sliding bracket mount; and
   coupling the swing-arm assembly to the frame to pivot between a storage mode and a cart mode, wherein the handle is positioned adjacent the first longitudinal end of the frame and the wheels are positioned beyond the second longitudinal end of the frame when the swing-arm assembly is positioned in the storage mode, and the handle is positioned beyond the second longitudinal end of the frame and the wheels are positioned adjacent a bed portion of the frame when the swing-arm assembly is positioned in the cart mode.

8. The method of claim 7, wherein coupling the swing-arm assembly to the frame comprises:
   coupling the swing arms to respective sliding bracket mounts pivotably coupled to the frame.

9. The mobile cart of claim 8, wherein coupling the swing-arm assembly to the frame to pivot between a storage mode and a cart mode further comprises:
   coupling the swing-arm assembly to the frame to convert to at least one mode selected from the group of modes comprising a rapid-deployment mode, a shelter mode, and a table mode.

10. The method of claim 7, wherein forming the frame comprises:
    forming the frame configured as a storage container.

11. The method of claim 7, wherein forming the frame comprises:
    forming the frame with a bed portion, and a foot portion at the first longitudinal end thereof.

12. The method of claim 7, wherein forming the swing-arm assembly including the handle, comprises forming the handle to telescope on the swing arms in a direction away from and toward the swing arms.

* * * * *